United States Patent Office 3,082,210
Patented Mar. 19, 1963

3,082,210
NEW 10-(AZETIDINYL-ALKYL)PHENTHIAZINES
Robert Michel Jacob, Ablon-sur-Seine, Jacques Georges Robert, Gentilly, and Roland Armand Gaillard, Nogent, France, assignors to Societe des Usines Chimiques Rhone-Poulenc, Paris, France, a French body corporate
No Drawing. Filed Oct. 21, 1960, Ser. No. 66,376
Claims priority, application Great Britain Oct. 29, 1959
2 Claims. (Cl. 260—243)

This invention relates to new derivatives of phenthiazine, to processes for their preparation and pharmaceutical compositions containing them.

It is well known that various N-substituted phenthiazine derivatives possess valuable therapeutic properties. Some are useful primarily on account of outstanding antihistaminic activity, others because of their unusually powerful effect as potentiators of drugs which act upon the nervous system and of their efficacy as anti-shock agents and yet others, for example, are effective agents for controlling or minimising motion-sickness. It has, nevertheless, been demonstrated that of the very large number of possible N-substituted phenthiazine compounds, which have heretofore been proposed or tested by various workers, only comparatively few types have been proved to have useful application in human or veterinary medicine and that both the nature and the degree of useful effect can radically alter even with apparently small changes in chemical structure.

It is an object of the present invention to provide new phenthiazine derivatives, which possess unexpectedly useful pharmacological properties, conforming to the general formula:

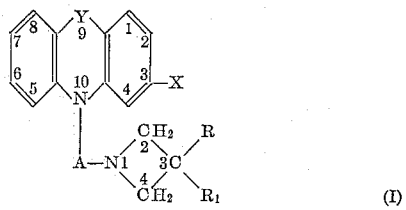

(wherein R and R₁, which may be the same or different, represent hydrogen atoms or lower alkyl groups, A represents a straight or branched chain divalent saturated aliphatic hydrocarbon group containing 2 to 6 carbon atoms, X represents a hydrogen or halogen atom or a lower alkyl, lower alkoxy, lower acyl, lower alkylthio, lower alkylsulphonyl, cyano, dimethylsulphamoyl, or trifluoromethyl group, and Y represents a sulphur atom or an SO or SO₂ group), and their acid addition and quaternary ammonium salts. When the hydrocarbon chain A contains an asymmetric carbon atom, the compounds of Formula I can exist in optically active forms. The present invention includes within its scope the racemates as well as the corresponding optically active isomers of such compounds. The qualification "lower" as applied herein means that the group in question contains not more than four carbon atoms.

The aforesaid new phenthiazine derivatives possess valuable pharmaco-dynamic properties as neuroleptics, antihistaminics, antiemetics, and potentiators of narcosis. Preferred compounds are those in which A is a

—(CH₂)₃— group and in particular those in which radical X is a chlorine atom, or methoxy, cyano, methylthio or dimethylsulphamoyl group. 3-chloro-10-(3-1′-azetidinylpropyl))phenthiazine and its acid addition salts are especially valuable.

These new phenthiazine compounds may be prepared by the application of known methods for the conversion of phenthiazine and its C-substitution products into the corresponding 10-aminoalkyl-phenthiazines. Such methods when so applied can be defined generically as comprising the interaction of a phenthiazine derivative of the formula:

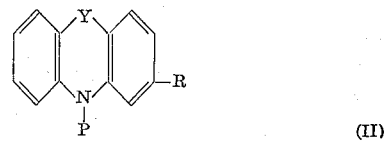

(where X and Y are as hereinbefore defined) with a compound Q, the group P and the compound Q being such that they will interact to produce or form in the 10-position of the phenthiazine nucleus an aminoalkyl residue of the formula:

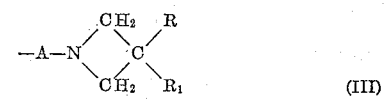

(wherein R, R₁, and A are as hereinbefore defined). By the term "known methods" as used herein is meant methods heretofore employed or described in the chemical literature.

Specific procedures that can be employed are as follows:

(1) Effecting the interaction of a phenthiazine derivative of the general formula:

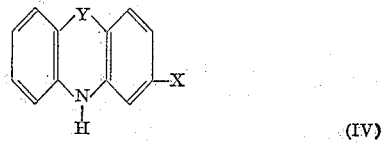

(wherein X and Y are as hereinbefore defined) with an azetidine derivative of the general formula:

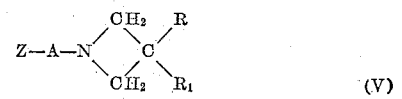

(wherein Z represents the acid residue of a reactive ester, such as a halogen atom or a sulphonic or sulphuric ester residue, and R, R₁, and A are as hereinbefore defined). In this condensation, when X is an acyl group, it may be advantageous to protect this group during the reaction, for example, by forming an anil or ketal.

The reaction may be carried out with or without a solvent in the presence or absence of a condensing agent. It is advantageous to use a solvent of the group of aromatic hydrocarbons (for example, toluene or xylene) in the presence of a condensing agent preferably of the class of alkali metals and their derivatives (such as, for example, hydrides, amides, alkoxides, metal alkyls or aryls) and, more particularly, metallic sodium, sodamide, lithium hydride, sodium tert-butoxide, butyllithium and phenyllithium. The reaction is preferably carried out at the boiling temperature of the solvent. It is advantageous to use the reactive ester of Formula V in the form of the free base in solution in, for example, benzene, toluene, or xylene, and to add it to the mixture of the other reactants wherein the phenthiazine employed may already be present, in part at least, in the form of an alkali metal salt. The reaction may also be carried out with a salt of the reactive ester but in this case it is necessary to use a greater proportion of the condensing agent in order to neutralise the acid of the salt employed.

It has unexpectedly been found that, when in this procedure the hydrocarbon chain A is a branched chain containing four to six carbon atoms with three of the carbon atoms in a straight line (when, for example, A is the grouping —CH₂—CH(CH₃)—CH₂—) and R and R₁ are both hydrogen atoms, a transposition occurs during the course of the reaction and products are obtained in which A is a trimethylene group and at least one of R and R₁ is a lower alkyl group. Thus, when phenthiazine is reacted with an azetidine derivative of the general formula:

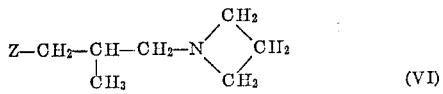

(Z being as hereinbefore defined) the product obtained is of the formula:

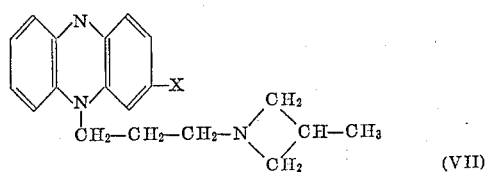

(2) Effecting the interaction of a phenthiazine derivative of the general formula:

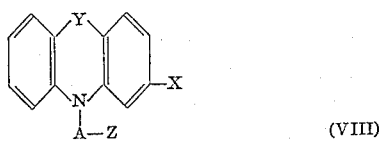

(wherein A, X, Y and Z are as hereinbefore defined) with an azetidine of the general formula:

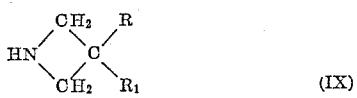

(wherein R and R₁ are as hereinbefore defined).

The reaction may be carried out by heating the reagents at a temperature between 30 and 120° C., preferably in an inert organic solvent such as an alcohol or an aromatic hydrocarbon (for example, benzene or xylene) if desired in the presence of a condensing agent acting as an acid acceptor, such as an alkali metal carbonate or a tertiary amine (for example, triethylamine or pyridine). An excess of azetidine may equally well be used as condensing agent.

Other processes which can be employed for the preparation of phenthiazine derivatives of general Formula I are as follows:

(3) Effecting the decomposition of a phenthiazine-10-carboxylate of the general formula:

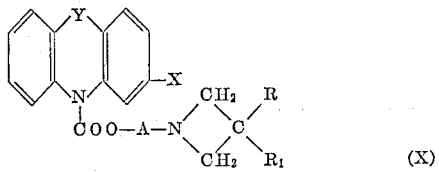

(wherein R, R₁, A, X and Y are as hereinbefore defined) by heating the carboxylate, preferably to a temperature above 100° C., for example between 150 and 220° C., until evolution of carbon dioxide ceases.

The reaction can be effected with the phenthiazine-10-carboxylate alone, i.e. without a diluent, or in an inert organic solvent of high boiling point such as diphenyl or diphenyl oxide, o-dichlorobenzene, quinoline or weak bases.

(4) In the case of compounds of general Formula I where Y represents an SO or SO₂ group, oxidation of the corresponding phenthiazine derivatives in which Y represents a sulphur atom or an SO group. In practice, such oxidation will normally be effected by means of hydrogen peroxide.

For therapeutic purposes, the bases of general Formula I are preferably employed as such or in the form of acid addition salts containing anions which are relatively innocuous to the animal organism in the therapeutic doses of the salts (such as hydrochlorides, and other hydrohalides, phosphates, nitrates, sulphates, acetates, succinates, benzoates, maleates, fumarates, theophyllinacetates, salicylates, phenolphthalinates or methylene-bis-hydroxynaphthoates) so that the beneficial physiological properties inert in the bases are not vitiated by side-effects ascribable to the anions. Similarly, they may also be employed in the form of quaternary ammonium salts obtained by reaction with organic halides (e.g. methyl or ethyl iodide, chloride or bromide or allyl or benzyl chloride or bromide) or other reactive esters, e.g. sulphates and toluene-p-sulphonates.

The following examples illustrate the invention:

*Example I*

A solution of 9-oxy-10-(2-chloroethyl)phenthiazine (8.3 g.) and azetidine (5.7 g.) in anhydrous benzene (75 cc.) is heated for 4 hours at 70–80° C. in a stainless steel autoclave. After cooling, the reaction mixture is diluted with ethyl acetate (150 cc.). The organic phase is washed with water (350 cc. in all) and extracted with a solution of about 0.3 N hydrochloric acid. The aqueous acid phase is separated and made alkaline by the addition of potassium carbonate. The free base is extracted with ethyl acetate and the organic solution is dried over anhydrous potassium carbonate and concentrated to dryness under reduced pressure (about 20 mm. Hg).

There is thus obtained 9-oxy-10-(2-1'-azetidinylethyl)phenthiazine (8.2 g.) which, after two successive recrystallisations from ethyl acetate, is in the form of a white crystalline powder, M.P. 157–158° C.

The azetidine (B.P. 61–61.5° C./764 mm. Hg) is prepared by the method of Howard and Marckwald, Ber. 32, 2032 (1899).

*Example II*

A solution of 3-methoxy-10-(3-toluene-p-sulphonyloxy-2-methylpropyl)phenthiazine (22.8 g.) and azetidine (8.5 g.) in anhydrous benzene (100 cc.) is heated for 4 hours at 60° C. in a stainless steel autoclave. After cooling, the reaction mixture is diluted with ethyl acetate (150 cc.). The organic phase is washed with water (350 cc. in all) and then extracted with N hydrochloric acid solution (150 cc.). The aqueous acid phase is separated and made alkaline by the addition of potassium carbonate (50 g.). The free base is extracted with ethyl acetate and the solution is dried over anhydrous potassium carbonate and concentrated to dryness under reduced pressure (about 20 mm. Hg). There is thus obtained 3 - methoxy - 10-(3-1'-azetidinyl-2-methylpropyl)phenthiazine (10 g.) which, after two recrystallisations from isopropyl ether and ethyl acetate respectively, is in the form of a white crystalline powder, M.P. 126–127° C.

*Example III*

A solution of 3-chloro-10-(3-chloropropyl)phenthiazine (12.4 g.) and azetidine (5.7 g.) in anhydrous benzene (100 cc.) is heated at 70–80° C. for 4 hours in a stainless steel autoclave. After cooling, the reaction mixture is diluted with benzene (100 cc.). The organic phase is washed with water (400 cc. in all) and then extracted with N hydrochloric acid (2 × 75 cc.). The aqueous acid phase is separated and made alkaline by the gradual addition of potassium carbonate (50 g.). The free base is extracted with ethyl acetate, and the solution is dried over anhydrous potassium carbonate and concentrated to dryness under reduced pressure (about 14 mm. Hg).

There is thus obtained 3-chloro-10-(3-1'-azetidinylpropyl)phenthiazine, which, after two successive recrystallisations from petroleum ether (B.P. 60–70° C.), is in the form of a while crystalline powder, M.P. 61–63° C.

Example IV

A solution of 10-(3-toluene-p-sulphonyloxy-2-methylpropyl)phenthiazine (42.5 g.) and azetidine (17.1 g.) in anhydrous benzene (200 cc.) is heated under reflux for 2 hours. After cooling, the organic solution is decanted and extracted with N hydrochloric acid solution (125 cc.). The acid aqueous phase is separated and made alkaline by the addition of sodium hydroxide solution (d=1.33, 12.5 cc.). The free base is extracted with ether and the organic solution dried over anhydrous potassium carbonate and concentrated to dryness under reduced pressure (about 15 mm. Hg). The resultant oil is dissolved in cyclohexane, and the solution filtered through a column of special chromatographic alumina (200 g.) and then eluted with cyclohexane. After evaporation of the solvent, 10-(3-1'-azetidinyl-2-methylpropyl)phenthiazine (14.5 g.) is obtained which, after recrystallisation from petroleum ether, is a white crystalline powder, M.P. 63–65° C.

Example V

A solution of 10-(2-toluene-p-sulphonyloxypropyl)phenthiazine (41.1 g.) and azetidine (17.1 g.) in anhydrous benzene (200 cc.) is heated under reflux for 2 hours. The crude base is isolated and purified as in Example IV and 10-(2-1'-azetidinylpropyl)phenthiazine (6.4 g.) is obtained which, after three successive recrystallizations from petroleum ether, is a white crystalline powder, M.P. 64–67° C.

Example VI

A solution of 3-ethyl-10-(3-toluene-p-sulphonyloxy-2-methylpropyl)phenthiazine (22.6 g.) and azetidine (8.6 g.) in benzene (100 cc.) is heated under reflux for 2 hours. The crude base is isolated and purified as in Example IV and 3-ethyl-10-(3-1'-azetidinyl-2-methylpropyl)phenthiazine (7.6 g.) is obtained as a pale yellow oil. The acid maleate, prepared and recrystallised from ethyl acetate, melts at 126–127° C.

Example VII

A solution of 3-dimethylsulphamoyl-10-(3-chloropropyl)phenthiazine (7.65 g.) and azetidine (3.4 g.) in anhydrous benzene (40 cc.) is heated under reflux for 2 hours. The crude base is isolated as in Example IV but without carrying out the purification over alumina. 3-dimethylsulphamoyl-10-(3-1'-azetidinylpropyl)phenthiazine (7.3 g.) is obtained which, after recrystallisation from acetonitrile, is a pale yellow crystalline powder, M.P. 120–122° C.

Example VIII

A solution of 3-cyano-10-(3-toluene-p-sulphonyloxypropyl)phenthiazine (29 g.) and azetidine (11 g.) in anhydrous benzene (150 cc.) is heated under reflux for 4 hours. The crude base is isolated and purified (filtration solvent over alumina being a benzene-cyclohexane (1:1) mixture) as in Example IV. 3-cyano-10-(3-1'-azetidinylpropyl)phenthiazine (11 g.) is obtained which, after crystallisation from petroleum ether (B.P. range 70–120° C.), is a pale yellow crystalline powder, M.P. 72–74° C.

Example IX

A solution of 3-trifluoromethyl-10-(3-chloropropyl)phenthiazine (17.2 g.) and azetidine (7.5 g.) in anhydrous benzene (100 cc.) is heated under reflux for 3 hours. The crude base is isolated as in Example VII and 3-trifluoromethyl-10-(3-1'-azetidinylpropyl)phenthiazine (7 g.) is obtained which, after two successive recrystallisations from petroleum ether, is a which crystalline powder, M.P. 37–38.5° C.

Example X

A solution of 3-cyano-10-(3-chloro-2-methylpropyl)phenthiazine (53. g.) and azetidine (14.3 g.) in anhydrous benzene (200 cc.) is heated for 3 hours under reflux and the crude base isolated and purified (filtration solvent over alumina being a benzene-cyclohexane (1:1 mixture) as in Example IV. 3-cyano-10-(3-1'-azetidinyl-2-methylpropyl)phenthiazine (5.3 g.) is obtained which, after two successive recrystallisations from petroleum ether (B.P. range 70–120° C.), is a pale yellow crystalline powder, M.P. 91–93° C.

Example XI

A solution of laevorotatory 3-methoxy-10-(3-methanesulphonyloxy-2-methylpropyl)phenthiazine (15.2 g.) and azetidine (6.8 g.) in anhydrous benzene (100 cc.) is heated under reflux for 2 hours and the crude base isolated as in Example VII. Laevorotatory 3-methoxy-10-(3-1'-azetidinyl-2-methylpropyl)phenthiazine (8.4 g.) is thus obtained which, after recrystallisation from propanol, is a white crystalline powder, M.P. 116° C., $[\alpha]_D^{24} = -24°$ (c.=5, benzene).

Example XII

A solution of 3-methylthio-10-(3-methanesulphonyloxy-2-methylpropyl)phenthiazine (19.75 g.) and azetidine (8.55 g.) in anhydrous benzene (100 cc.) is heated under reflux for 2 hours, and the crude base is isolated as in Example VII. 3-methylthio-10-(3-1'-azetidinyl-2-methylpropyl)phenthiazine (14 g.) is thus obtained which, after two successive recrystallisations from ethanol, is a white powder, M.P. 118° C.

Example XIII

A solution of 3-chloro-10-(3-methanesulphonyloxy-2-methylpropyl)phenthiazine (42 g.) and azetidine (18.8 g.) in anhydrous benzene (150 cc.) is heated under reflux for 2 hours and the crude base isolated as in Example VII. 3-chloro-10-(3-1'-azetidinyl-2-methylpropyl)phenthiazine (23.3 g.) is obtained which, after two successive recrystallisations from ethanol, is a white powder, M.P. 106° C.

Example XIV

Sodamide (4.1 g.) is added to a solution of 3-chlorophenthiazine (23.4 g.) in anhydrous toluene (200 cc.) at 100° C., and the mixture is refluxed for 30 minutes. 1-chloro-3-1'-azetidinyl propane (13.3 g.) is then added and the mixture heated under reflux for 3 hours. After cooling, the reaction mixture is diluted with ether (400 cc.) and then washed with water (200 cc.). The organic phase is then extracted with 0.2 N hydrochloric acid (700 cc.). The aqueous phase is separated and made alkaline with sodium hydroxide solution (d.=1.33, 15 cc.). The free base is extracted with ether and the organic phase dried over anhydrous potassium carbonate and concentrated to dryness under reduced pressure (about 15 mm. Hg). 3-chloro-(3-1'-azetidinyl propyl)phenthiazine (27.3 g.) is obtained, M.P. 60–62° C.

Example XV

A solution of 3-methoxy-10-(3-methanesulphonyloxy-2-methylpropyl)phenthiazine (9.5 g.) and 3,3-dimethylazetidine (6.65 g.) in anhydrous benzene (100 cc.) is heated under reflux for 2 hours, and the crude base isolated and purified as in Example IV. 3-methoxy-10-(3-3',3'-dimethyl-1'-azetidinyl-2-methylpropyl)phenthiazine (2.1 g.) is obtained as a pale yellow oil, the acid maleate of which, prepared and recrystallised from ethyl acetate, melts at 156° C.

Example XVI

Sodamide (1.9 g.) is added ot a solution of phenthiazine (9 g.) in anhydrous toluene (100 cc.) at 100° C., and the mixture is refluxed 30 minutes. 1-chloro-2-methyl-3-1'-azetidinylpropane (6.7 g.) is then added and the reaction mixture heated under reflux for a further 6 hours. The crude base is isolated as in Example XIII and the oil obtained is dissolved in cyclohexane, and filtered through a column of special chromatographic alumina (100 g.) and eluted with cyclohexane followed by benzene. After evaporation of the solvent, 10-(3-3'-methyl-1'-azetidinylpropyl)phenthiazine (9.6 g.) is obtained as a pale yellow oil, the acid oxalate of which, prepared in acetone and recrystallised from methanol, melts at 186–189° C.

*Example XVII*

Sodamide (1.97 g.) is added to a solution of 3-chlorophenthiazine (9.35 g.) in anhydrous toluene (100 cc.) at 100° C., and the mixture is refluxed for 30 minutes. 1-chloro-2-methyl-3-1′-azetidinylpropane (6 g.) is then added and the reaction mixture is heated under reflux for a further 6 hours. The crude base is isolated and purified as in Example XIII. 3-chloro-10-(3-3′-methyl-1′-azetidinylpropyl)phenthiazine (9.6 g.) is obtained in the form of a pale yellow oil, the fumarate of which, prepared and recrystallised from ethanol, melts at 152–154° C.

*Example XVIII*

A solution of 9,9-dioxy-10-(3-methanesulphonyloxy-2-methylpropyl)phenthiazine (33 g.) and azetidine (14.7 g.) in anhydrous benzene (1100 cc.) is heated under reflux for 2 hours and the crude base isolated as in Example VII. 9,9-dioxy-10-(3-1′azetidinyl-2-methylpropyl)-phenthiazine (16 g.) is obtained which, after two successive recrystallisations from ethanol, is a white crystalline powder, M.P. 115–116° C.

The present invention includes within its scope pharmaceutical compositions which comprise one or more of the compounds of general formula I, or an acid addition or quaternary ammonium salt thereof, together with a significant amount of a pharmaceutical carrier. In clinical practice the compounds of the present invention will normally be administered orally, in consequence of which the preferred compositions are those of the kind suitable for oral administration.

Solid compositions for oral administration include compressed tablets, pills, dispersible powders, and granules. such solid compositions one or more of the active compounds of general Formula I is or are admixed with at least one inert diluent such as calcium carbonate, potato starch, alginic acid, or lactose. The compositions may also comprise, as is normal practice, additional substances other than inert diluents, e.g. lubricating agents, such as magnesium stearate, and sweetening, flavouring and preserving agents.

Liquid compositions for oral administration include pharmaceutically acceptable emulsions, solutions, suspensions, syrups and elixirs containing inert diluents commonly used in the art, such as water and liquid paraffin. besides inert diluents such compositions may also comprise adjuvants, such as wetting and suspending agents, and sweetening, flavouring and preserving agents.

The compositions according to the invention for oral administration also include capsules of absorbable material such as gelatin containing one or more of the active substances of general Formula I with or without the addition of diluents or excipients.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. The compositions may also contain adjuvants such as preserving, wetting, emulsifying and dispersing agents. They may be sterilised by, for example, filtration through a bacteria-retaining filter, by the incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the therapeutic effect desired in the species of animal shall be obtained. Obviously several unit dosage forms may be administered at about the same time. In general, the preparations should normally contain between 0.1 and 10 mg. per kilogram of weight of the animal to be treated. In human medicine, the preparations of the present invention should be administered so as to give, in the case of oral administration, 20 to 600 mg. of active substance per day and, in the case of parenteral administration, 10 to 500 mg. of such substance per day.

The following examples illustrate pharmaceutical compositions according to the invention.

*Example XIX*

Tablets weighing 150 mg. each are prepared having the following composition:

|  | Mg. |
|---|---|
| 3 - methoxy - 10 - (3 - 1′ - azetidinyl - 2 - methylpropyl)phenthiazine | 25.8 |
| Starch | 91.2 |
| Hydrated silica | 30.0 |
| Magnesium stearate | 3.0 |

*Example XX*

Tablets are prepared each of which has the following composition:

|  | Mg. |
|---|---|
| 3 - chloro - 10 - (3 - 1′ - azetidinylpropyl)phenthiazine | 10.6 |
| Starch | 106.4 |
| Hydrated silica | 30.0 |
| Magnesium stearate | 3.0 |

We claim:
1. A member of the class consisting of the phenthiazine derivatives of the formula:

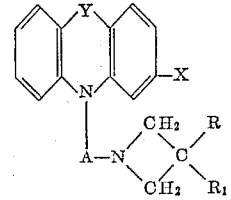

and their non-toxic acid addition salts, where R and R₁ are each chosen from the class consisting of hydrogen atoms and lower alkyl groups, A is a divalent, saturated aliphatic wholly hydrocarbon group containing 2 to 6 carbon atoms, X is selected from the class consisting of hydrogen and chlorine atoms, and lower alkyl, lower alkoxy, lower alkylthio, lower alkylsulphonyl, cyano, dimethylsulphamoyl and trifluoromethyl groups, and Y is a member of the class consisting of sulphur atoms and SO and SO$_2$ groups.

2. The compound 3-chloro-10-(3-1′-azetidinylpropyl)-phenthiazine.

References Cited in the file of this patent

UNITED STATES PATENTS 2,928,767    Gulesich et al. _____ Mar. 15, 1960

FOREIGN PATENTS 563,610    Belgium _____ June 20, 1958
632,277    Great Britain _____ Nov. 18, 1949
716,227    Great Britain _____ Sept. 29, 1954
789,276    Great Britain _____ Jan. 15, 1958

OTHER REFERENCES

Richter's Organic Chemistry, volume 3, "Heterocyclic Compounds," pages 3 to 5, P. Blakiston's Son and Co., Philadelphia (1923).

Testa et al.: Annalen der Chemie, volume 635, pages 121 to 122 and 125-6 (September 1960).